(12) United States Patent
Kahrger et al.

(10) Patent No.: US 10,071,860 B2
(45) Date of Patent: Sep. 11, 2018

(54) PROCESS AND DEVICE FOR REPLACING IDLER ROLLERS OF A BELT CONVEYOR

(71) Applicant: TAKRAF GmbH, Leipzig (DE)

(72) Inventors: Rainer Kahrger, Leipzig (DE); Mario Dilefeld, Leipzig (DE); Steffen Vollrath, Leipzig (DE)

(73) Assignee: TAKRAF GmbH, Leipzig (DE)

( * ) Notice: Subject to any disclaimer, the term of this patent is extended or adjusted under 35 U.S.C. 154(b) by 551 days.

(21) Appl. No.: 14/220,423

(22) Filed: Mar. 20, 2014

(65) Prior Publication Data

US 2014/0283351 A1    Sep. 25, 2014

(30) Foreign Application Priority Data

Mar. 21, 2013    (DE) .................. 10 2013 205 041

(51) Int. Cl.
*B23P 11/02*    (2006.01)
*B23P 19/04*    (2006.01)
(Continued)

(52) U.S. Cl.
CPC .......... *B65G 21/10* (2013.01); *B65G 15/00* (2013.01); *B65G 39/00* (2013.01); *B65G 39/10* (2013.01);
(Continued)

(58) Field of Classification Search
CPC ........ B65G 21/10; B65G 21/06; B65G 15/00; B65G 39/00; B65G 39/02; B65G 39/10;
(Continued)

(56) References Cited

U.S. PATENT DOCUMENTS 3,430,755 A * 3/1969 Allendorf ............. B65G 39/10
                                                      198/825
3,575,274 A * 4/1971 Ewing .................... B65G 15/00
                                                      104/118
(Continued)

FOREIGN PATENT DOCUMENTS

CA    2216196 A1 *  5/1999  ............. B65G 15/00
DE    11 14 735 B    10/1961
(Continued)

OTHER PUBLICATIONS

"Safe-Guard™, Belt Lifter", www.asgco.com.
(Continued)

*Primary Examiner* — Bayan Salone
(74) *Attorney, Agent, or Firm* — McGlew and Tuttle, P.C.

(57) ABSTRACT

A method and a device are provided for replacing individual idler rollers for conveyors, with which a web belt can be lifted and worn-out or damaged idler rollers in upper and lower runs can be individually replaced. The device includes, separately for replacing the idler rollers in the upper run and in the lower run, a subframe (1) for lifting the web belt (7) and for holding the web belt (7), such that a sufficient clearance is formed for replacing worn-out idler rollers (53) by means of a changing frame (2). A service vehicle is equipped with a lifting apparatus for moving dividing devices. The process steps include lifting the web belt (7), removing the old idler roller ($53^{old}$), inserting the new idler roller ($53^{new}$) and lowering the web belt (7). The drawing shows the use of two dividing devices in the replacing of idler rollers in the upper run.

20 Claims, 7 Drawing Sheets

(51) Int. Cl.
    *B25B 11/02*     (2006.01)
    *B65G 15/00*     (2006.01)
    *B65G 21/06*     (2006.01)
    *B65G 39/00*     (2006.01)
    *B65G 43/00*     (2006.01)
    *B65G 39/10*     (2006.01)
    *B65G 21/10*     (2006.01)

(52) U.S. Cl.
    CPC ............ *B65G 43/00* (2013.01); *B23P 11/027* (2013.01); *B23P 19/041* (2013.01); *B25B 11/02* (2013.01); *Y10T 29/4973* (2015.01); *Y10T 29/53961* (2015.01)

(58) Field of Classification Search
    CPC ................. B65G 43/00; Y10T 29/4973; Y10T 29/53961; Y10T 29/53978; B25B 11/02; B23P 11/027; B23P 19/041
    USPC .................... 29/402.08, 281.1, 281.3, 281.5; 269/289 MR, 37
    See application file for complete search history.

(56) References Cited

U.S. PATENT DOCUMENTS

| | | | | |
|---|---|---|---|---|
| 3,614,823 | A | * | 10/1971 | Weber et al. .......... B65G 15/00 198/827 |
| 4,326,601 | A | * | 4/1982 | Grove ................... B66F 17/006 116/298 |
| 4,674,168 | A | * | 6/1987 | Bittner ................. B23D 35/008 241/82 |
| 6,102,460 | A | * | 8/2000 | Baldo Ramos ........... B66C 1/62 294/67.1 |
| 9,333,976 | B2 | * | 5/2016 | Kahrger .................. B65G 39/00 |
| 2007/0039802 | A1 | * | 2/2007 | Kahrger ................ B65G 41/008 198/303 |
| 2008/0060909 | A1 | * | 3/2008 | DeVries ................. B65G 15/00 198/300 |
| 2010/0224845 | A1 | * | 9/2010 | Dowling ................ B65G 15/62 254/93 HP |
| 2015/0082596 | A1 | * | 3/2015 | Carter .................... B65G 15/00 29/402.08 |

FOREIGN PATENT DOCUMENTS

| | | |
|---|---|---|
| DE | 1 219 856 B | 6/1966 |
| DE | 72 38 731 U | 4/1973 |
| DE | 2 163 726 A1 | 6/1973 |
| DE | 2 342 000 A1 | 3/1975 |
| DE | 1 48 501 A1 | 5/1981 |
| DE | 1 48 504 A1 | 5/1981 |
| DE | 29 17 338 C2 | 6/1985 |
| DE | 85 25 773 U1 | 11/1985 |
| DE | 10 2008 036 949 B4 | 6/2010 |

OTHER PUBLICATIONS

Australian Office Action dated Aug. 21, 2015.
Australian Office Action dated Nov. 9, 2015.
Solicitud N° 199800072 (API Montero Y Donoso Limitada).

\* cited by examiner

PROCESS AND DEVICE FOR REPLACING IDLER ROLLERS OF A BELT CONVEYOR

CROSS REFERENCE TO RELATED APPLICATIONS

This application claims the benefit of priority under 35 U.S.C. § 119 of German Patent Application DE 10 2013 205 041.0 filed Mar. 21, 2013, the entire contents of which are incorporated herein by reference.

FIELD OF THE INVENTION

The present invention pertains to a process and device for replacing individual idler rollers of a belt conveyor, in particular those of an idler roller station for conveyor systems with switched-off drive, with which the web belt can be lifted in an intended area, and worn-out or damaged idler rollers in the upper run and lower run can be replaced individually there. An idler roller station in the upper run usually consists of three or five idler rollers inserted in brackets that are arranged towards each other, such that a cross-sectional trough shape of the web belt is achieved. In the lower run, an idler roller station is usually equipped with two v-shaped idler rollers arranged towards each other. Because of the lower load ratios in the lower run, the idler roller stations there are removed further from one another than in the upper run. The changing device consists of two dividing devices, each with a subframe for lifting the web belt and a changing frame for the idler rollers in the upper run and in the lower run. All four frames of the device are brought into function at the respective idler roller station by means of a service unit that is conveyable and provided with a lifting apparatus.

BACKGROUND OF THE INVENTION

Individual idler rollers of idler roller stations in belt systems for large mass flows can no longer be changed manually in case of needed repairs because of their high net weight. Furthermore, for reasons of occupational safety, a replacement of idler rollers is only allowed in the resting state of the belt system. Since belt systems equipped with girland idler roller stations are frequently used in practical operation, replacement devices known from the literature on the state of the art are mainly directed at the replacement of entire idler roller girlands with usually three or five individual idler rollers connected to one another. Such devices are known, for example, from the publications DD 148 504 A1, DE 2 163 726 A and DE 2 342 000 C2. They all have in common the fact that a conveyable auxiliary device next to the belt system is used for replacing the idler roller girlands in the sequence of lifting the conveyor belt, detaching and removing the idler roller girland having the worn-out individual idler roller or a plurality of worn-out idler rollers as well as inserting the new idler roller girland. The work performed during a changing process can be made easier and the time for the changing process can be shortened by means of these devices.

In idler roller stations with individual idler rollers fastened in idler roller carriers, only the defective idler roller needs to be replaced in case of a repair. An aid for the replacement intended for this is known, for example, from the publication DE 1 219 856 B. According to this invention, provisions are made for lifting the web belt by means of a carrier placed onto the frame of the belt system. This carrier is equipped with rollers and is displaced transversely to the longitudinal direction of the web belt, whereby the rollers of the carrier are adapted to the respective profile (slope) of the web belt. After the web belt was lifted to a sufficient extent, the affected idler roller of the idler roller station can be replaced, and the web belt is then lowered again. The lifting device is then removed again. This solution is especially suitable for smaller belt conveyors, whose individual idler rollers can be manually replaced without additional technical aids. The additional use of further technical aids is necessary in belt conveyors for large mass flows.

A device for lifting the web belt in the upper run and lower run of a conveyor to obtain sufficient mounting clearance when replacing the idler rollers present there is known from the publication DE 85 25 773 U1 by the designation "web belt cover lifter." This device is a u-shaped subframe, which is hung in a height-adjustable manner on the support frame of the conveyor by means of claws from below on both sides. A lifting bar for lifting the web belt, which can be actuated in the vertical direction by means of a hydraulic cylinder, is located on the horizontal carrier of the subframe. After replacing the idler roller in question, the web belt is lowered again, and the subframe can be removed again.

A subframe for use in web belt conveyor systems, by means of which the conveyor belt is able to be selectively lifted in the upper run or in the lower run to replace idler rollers there if necessary or, in addition, to apply further idlers, is known from the company brochure "SAFE-GUARD™, BELT LIFTER" of the manufacturer ASGCO. This frame is placed onto the frame construction of the web belt conveyor system and can be adjusted in its height by increments. In an upper and a lower two-part horizontal carrier, it is assembled from both sides and thus can be connected to together by increments at intervals. A carrying belt which is fastened to one side of the subframe at the top and can be pulled by means of a tightening device on the other side of the subframe is used for picking up and for lifting the conveyor belt. This subframe has a lightweight-construction design and can consequently be favorably assembled and again removed at the site of use. Because of the assembly steps necessary for this from both sides of the web belt conveyor system, it is not suitable, however, for rapid replacement of a plurality of idler rollers at different sites of kilometer-long belt conveyor systems.

SUMMARY OF THE INVENTION

The basic object of the present invention is to present a process and a device, which makes possible a simple and fast replacement of individual idler rollers of a belt conveyor. In this case, the present invention is aimed, above all, at the replacement of idler rollers that can or may no longer be moved by maintenance personnel without additional aid because of their weight and their size.

According to the invention, a process is provided for replacing individual idler rollers of a belt conveyor. The process comprises picking up a web belt, in an area of an idler roller station, by a subframe inserted between an upper run and a lower run or between the lower run and the ground surface. The web belt and the subframe are lifted together by means of an external lifting apparatus. The subframe is set down, while carrying the web belt and maintaining a cross section, on a support frame of the belt conveyor or is hung on the subframe, while carrying the web belt and maintaining the cross section, on the support frame of the belt conveyor. A changing frame, with an external lifting apparatus, is inserted between the upper run and the lower run or between the lower run and the ground surface. An idler roller to be replaced is picked up with a pick-up means of the changing frame. The changing frame, together with the idler roller, is led out of an area between the upper run and lower run or between the lower run and ground surface, in a reverse manner, inserting a new idler roller into mounts of the idler roller to be replaced. The subframe is lifted by an external lifting apparatus, to detach the subframe from the support frame and lowering the web belt.

According to the present invention, the object is accomplished by this process, which is further described below, for replacing individual idler rollers of a belt conveyor. Belt conveyors have an upper run and a lower run, whereby the upper run frequently forms a trough shape due to obliquely directed idler rollers. The idler rollers, in this case, are often arranged in idler roller stations, such that the upper run and lower run are supported at regular distances by means of these idler roller stations. In these idler roller stations, the idler rollers are arranged relatively close to one another in idler roller brackets, which reduces the installation space for the replacement.

The process according to the present invention comprises the following process steps:

At first, in a step a), the web belt is picked up by a subframe inserted under the upper run or under the lower run (i.e., between the lower run and the ground surface) and is lifted together with same by means of an external lifting apparatus so far that the weight of the belt no longer rests on the idler rollers, and these are sufficiently accessible for the further steps. The lifting is performed by means of an external lifting apparatus, for example, a service vehicle on which a crane is arranged. The cross section of the belt is preferably maintained during the lifting. In case of a trough-shaped cross section, the belt must advantageously not be lifted out, but only lifted from the troughs, so that the belt is no longer in contact with the rollers.

Subsequently, in step b), the subframe is set down on a support frame of the belt conveyor, such that the subframe holds the belt up even without the external lifting apparatus. Brackets, which are arranged laterally at the subframe and can be pivoted out downwards, are provided for setting down on the support frame. During the lifting of the lower run, the subframe is suspended in the support frame of the belt conveyor. The goal is for the subframe to be fixed in a stable manner at the support frame of the belt conveyor and for the belt to thus remain reliably lifted for the subsequent steps.

In the next step, c), a changing frame is inserted under the run of the belt conveyor lifted by means of the subframe and picks up the idler roller to be replaced. For this, pick-up means are provided at the changing frame for the idler roller to be replaced.

Subsequently, in step d), the changing frame together with the idler roller is brought out of the area under the upper run or lower run, the removed idler roller is detached from the changing frame, and the idler roller to be inserted is connected to the changing frame in order to be inserted subsequently at the old position by means of the changing frame.

In a further step e), the subframe is lifted by the external lifting apparatus, detached from the support frame, the web belt is lowered and the subframe is removed again.

By means of a repetition of steps c) and d), a plurality of idler rollers of an idler roller station (5, 6) can be replaced without lowering the web belt in the meantime.

Furthermore, only one external lifting apparatus is preferably used for the entire changing process. After the setting down of the subframe, the external lifting apparatus is detached from the subframe and then connected to the changing frame. Thus, costs for having lifting apparatuses available can advantageously be reduced.

In this case, the position of connection between changing frame and external lifting apparatus is especially preferably adjusted, so that this lies vertically above the center of gravity of the changing frame alone or connected to an idler roller. The arrangement vertically above the center of gravity of the changing frame alone is thus present during the insertion of the changing frame, and the arrangement vertically above the changing frame and idler roller is present during the removal of the changing frame from the area of the idler roller station. To the extent that this is possible, the changing frame may, of course be already adjusted for the changing frame with idler roller. Advantageously, the changing frame can thus be inserted directly under the lower run or upper run. To this end, the anchoring eyelet of the changing frame for fastening the external lifting apparatus in the state inserted under the lower run or upper run is preferably displaceable at an angle to the direction of the conveyor belt system.

The device, according to the present invention for replacing individual idler rollers of a belt conveyor, consists of two parts, and comprises a subframe which can be inserted under the upper run or lower run of the conveyor system. This subframe has means for suspending at the support frame of the belt conveyor and/or for setting down on the support frame des belt conveyor. Furthermore, means are provided for picking up the web belt.

Furthermore, the device comprises a changing frame with means for picking up the idler roller to be replaced.

Both the subframe and the changing frame have at least one anchoring eyelet for picking up by means of a lifting apparatus.

One essential aspect of the device is that the subframe and changing frame are adapted structurally to the idler roller station such that they can be inserted under the upper run and/or under the lower run in a simple and collision-free manner. This is achieved by a favorable geometric shape.

In this case, the subframe preferably picks up the web belt in its entire width. Advantageously, a loaded web belt can thus also be safely lifted and set down.

Furthermore, the means for picking up the web belt are preferably a plurality of supports, which can be adjusted in terms of their slope and can be locked. These are capable of picking up the web belt while maintaining the belt cross section, which is advantageous in a trough-shaped web belt in the upper run, since the web belt does not then have to be lifted so far until it is no longer in contact with the idler rollers and, in addition, during the lifting of loaded conveyed goods, the load cannot fall down to the side.

Likewise preferably, the means for setting down the subframe on the support frame are at least two collapsible brackets. This design is especially suitable for subframes for lifting the upper run, since the web belt in the upper run lies, for the most part, spatially above the support frame. The brackets can preferably be locked in the unfolded state in order to prevent an inadvertent unfolding. For a height adjustment, the brackets may, moreover, have a telescopic design in order to compensate for different belt heights in various positions of the idler roller station.

As an alternative, the subframe may also have a straight design, and the means for suspending at the support frame are displacing carriers with hooks arranged at the ends. Displacing carrier with hooks means here that the ends of the subframe have a telescopic design and hooks for suspending at the support frame of the belt conveyor are arranged at these telescopic ends. As a result, the subframe can be moved, in the non-telescoped state, in the area of the support frame of the belt conveyor without colliding with same. Depending on whether the hooks at the telescopic ends are directed inwards or outwards, the subframe is either moved upwards untelescoped and extended and set down there, or moved upwards telescoped and maintained there until the hooks mesh with and set down the support frame.

In an alternative embodiment, a subframe may also have both unfoldable brackets and telescopic ends with hooks. This could then be advantageously used in a highly variable manner.

Furthermore, a pivotable idler roller pick-up is preferably provided as means for picking up the idler rollers at the changing frame. This pick-up has at least the length of an idler roller and is rotatably connected, in the center, to the changing frame. Furthermore, the idler roller pick-up preferably has movable claws for picking up the idler roller, which are likewise preferably fastened to the idler roller pick-up in a longitudinally displaceable manner, and this pick-up can thus advantageously be adjusted to idler rollers of various length.

The anchoring eyelet of the changing frame is also preferably displaceable in parallel to and at right angles to the direction of conveying of the web belt (in the inserted state of the changing frame). Thus, the alignment of the changing frame can be adjusted to the lifting apparatus in a suspended manner, and thus a straight alignment of the changing frame for inserting can be achieved.

Various aspects of the replacement process of an idler roller are described below as examples.

For replacing a worn-out or damaged idler roller, the changing frame with opened pick-up claws is brought in parallel to the idler roller in question with the lifting apparatus in the starting position. The oblique position of the idler roller pick-up opposite the changing frame was already adjusted beforehand. Since it is also possible to make the middle idler roller shorter than the obliquely arranged outer idler rollers in case of idler rollers arranged in a troughed manner, the distance of the pick-up claws to one another is also adjusted beforehand. The anchoring eyelet arranged at the top at the changing frame is displaced at the changing frame into a position vertically above the center of gravity of the changing frame and fixed there. If the idler rollers were not only inserted into the pick-up straps of the idler roller stations, but were additionally bolted to same, the connection must be broken. Then, the changing frame is guided so close to the idler roller that the idler roller axes are located in the pick-up area of the opened claws. The claws are closed, the idler roller can be lifted out of its bracket and can be moved out of the area of the conveyor system. The old idler roller is set down and the new one is picked up. The new idler roller is inserted in reverse sequence as described above. If necessary, even further idler rollers of an idler roller station can be replaced. It is advantageous here to always remove and insert the idler rollers of an idler roller station from outside up to the middle from the side of the conveyor in question and to perform the replacement of the idler rollers lying on the opposite side from the other side. The middle idler roller can be selectively replaced from one of both sides.

After the necessary replacement of the idler rollers of an idler roller station, the web belt is lowered again with the subframe and the load-pick-up means, and the worn-out or damaged idler rollers of the next idler roller station of the upper run can be replaced in an identical manner.

The replacement of worn-out or damaged idler rollers of an idler roller station in the lower run takes place in a similar manner with a subframe for lifting the web belt and a changing frame for the idler rollers. However, structural differences compared to the upper run are to be taken into account here. Since the web belt in the lower run is not loaded with conveyed goods as in the upper run, but rather runs back empty, the load of the web belt is lower there. Therefore, the guidelines for web belt conveyor systems make it possible to design the distances between the idler rollers greater there. Moreover, the web belt there is usually only troughed in two parts. The subframe for lifting the web belt and the idler roller changing frame are to be adapted to these changes connected therewith in the manner described below.

The subframe for lifting the web belt in the lower run has a u-shaped design in the side view. It consists of a lower horizontal, central carrier piece, which is designed as a hollow section, with the belt support and two displacing pieces which can be inserted on both sides from outside. The belt support with its upper support surface can be adapted to the available belt profile. Thus, it is, for example, possible to make it v-shaped. The displacing pieces are provided with hooks on the outside and can thus be hung in the lifted state on the longitudinal support of the support frame of the belt conveyor system.

This subframe is brought in the extended state of both displacing pieces in the longitudinal direction of the idler rollers under the web belt into the starting position and then picked up and lifted by the lifting apparatus of the service vehicle via anchoring eyelets arranged on both sides on the outside. After the web belt has been lifted so far that the lower idler rollers are exposed to a sufficient extent for replacing and the lower support surfaces of the outer hooks of both displacing pieces are located above the level of the longitudinal support of the support frame of the belt conveyor system, these outer displacing pieces are to be pushed onto one another. Before the two hooks from outside are in contact with the longitudinal supports, this pushing together is ended, and the subframe with its two hooks is set down from above onto the auxiliary support. In this case, the web belt always still has a distance, sufficient in height, to the idler rollers to be replaced.

The replacing of the idler rollers arranged in pairs in a v-shaped manner in the lower run should, in principle, be possible as the replacing of the idler rollers in the upper run. For this, a changing frame is provided, which also has a c-shaped design in the side view, a longitudinally displaceable anchoring eyelet and a carrier-like pick-up, equipped with claws, for the idler rollers, which is pivotable against the changing frame, in order to be able to pick up two idler rollers of a station arranged in a V position to one another. The changing frame has a horizontal frame piece on the outside in the upper area, which has an anchoring eyelet for connecting to a (mobile) lifting apparatus. For the other side of the belt system, this changing frame must have a mirror-image design in order to prevent collisions with other elements of the support frame of the conveyor system. For this reason, such a second changing frame with a mirror-image design to the first changing frame is provided for the lower run.

When replacing the worn-out or damaged idler rollers in the lower run, it is to be taken into account compared to the replacing of the idler rollers in the upper run that because of the larger number of idler roller stations in the upper run only limited clearance for the use of the idler roller changing frame is available in the lower run. Therefore, the process for replacing the idler rollers in the lower run must be aimed at the use of two changing frames.

For replacing a certain idler roller in the lower run, one of the two changing frames is used, which is intended for the installation situation in question as far as the structural design is concerned. That is the changing frame in the embodiment, which corresponds to the arrangement of the roller to be changed. For the idler roller on the other side of the belt, the other changing frame having a mirror-image design must be used for this.

The changing frame in question, which has been adapted to the respective installation situation, is lifted by the lifting apparatus of the service unit and is brought with its pivotable carrier and the opened pick-up claws into starting position next to the idler roller in question. The idler roller to be replaced is detached from the idler roller bracket and picked up by the claws of the changing device. For this, the changing device was pulled beforehand from the side with the lifting apparatus into the direction of the idler roller. Then, the picked-up idler roller is lifted and guided to the side out of the area of the belt system. It is important in this case that the web belt is located in a sufficiently high lifted position. The old idler roller is set down and the new idler roller is likewise picked up at its axis and inserted into the bracket ready for mounting and then fastened there. The replacing device is then set down.

If the replacement of the second idler roller of this station is also necessary, the second changing frame is used for this, which, for this case, is intended for this because of its specific design. The sequence of the operations necessary for this takes place as described above for the changing of the first idler roller.

Subsequently, the web belt is again lowered due to the actuation of the subframe together with the lifting apparatus of the service unit.

With the changing device, idler rollers of large belt systems in the upper run and in the lower run can be replaced simply and rapidly without greater efforts.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 3b is a side view showing the subframe brought into function at the support frame of the belt system compared to FIG. 3a;

DESCRIPTION OF THE PREFERRED EMBODIMENTS

Figure 1A:
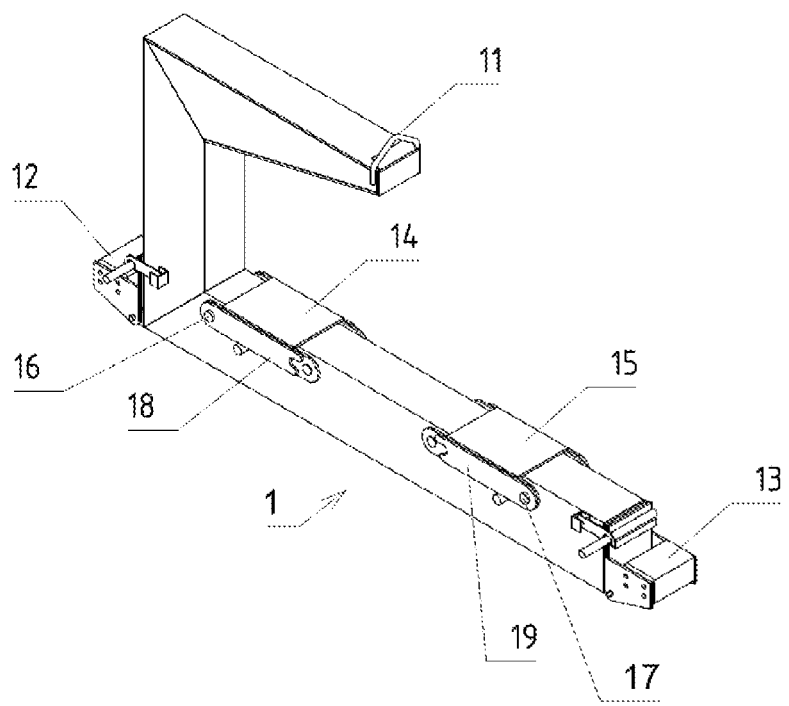
FIG. 1a is a perspective view showing a subframe for lifting the web belt in the upper run in the starting position.

Referring to the drawings in particular, because of the different number, size and arrangement of the idler rollers of a belt conveyor in the upper run and in the lower run, a replacing device for the idler rollers is to be adapted separately to the replacement in the upper run and in the lower run. Therefore, two dividing devices are provided, each of which is comprised of a subframe for lifting the web belt 7 and a changing frame for the idler rollers. All four frames of the device are brought into function at the respective idler roller station by means of a service unit that is conveyable and is provided with a lifting apparatus. Personnel can travel with this service vehicle along the belt conveyor of a conveyor system to a certain idler roller station and bring the subframe into position as well as perform the replacement of defective idler rollers with the suspended changing frame. Such service vehicles equipped with a lifting apparatus are known, for example, from the publications according to DD 148 501 A1 and DE 2 342 000 A1. They are used there for replacing idler roller girlands.

Figure 1B:
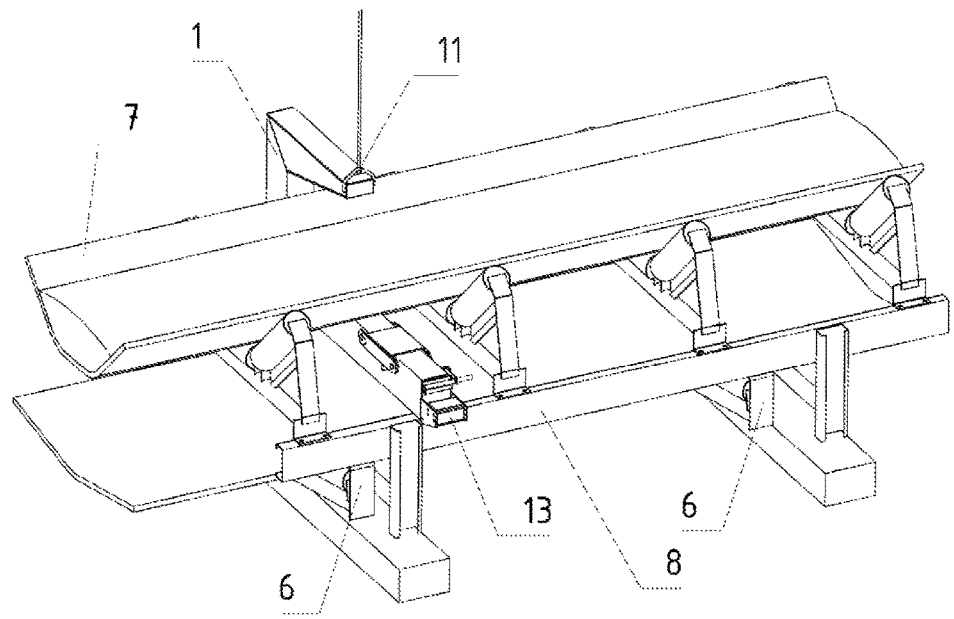
FIG. 1b is a perspective view showing the subframe according to FIG. 1a in the position set down on the support frame of a conveyor system.
Figure 1C:
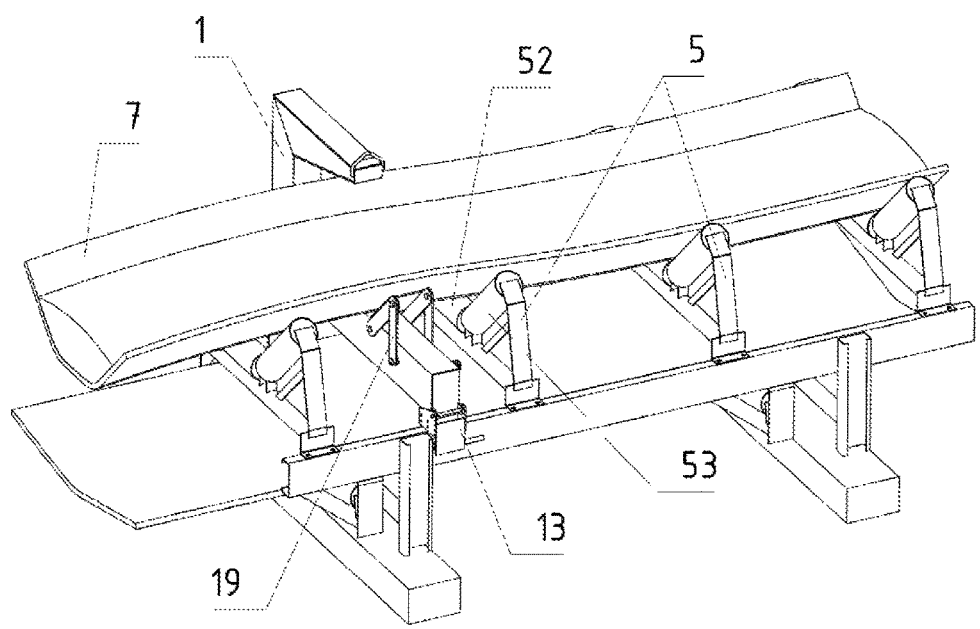
FIG. 1c is a perspective view showing the subframe in the position brought into the end position on the support frame of the conveyor system compared to the view according to FIG. 1b.

For replacing the idler rollers 51, 52, 53, which are arranged in a troughed manner in the upper run, of the idler roller station 5 of a belt conveyor, a subframe 1 according to FIGS. 1a through 1c is provided for lifting the web belt 7 and a changing frame 2 according to FIGS. 2a through 2d for replacing defective or worn-out idler rollers $51^{old}$, $52^{old}$ and/or $53^{old}$ with new functional idler rollers $51^{new}$, $52^{new}$ and/or $53^{new}$. In the view in the drawing, the superscripts $^{old}$ and $^{new}$ are omitted, since in the reproduction of a respective situation it may involve both the removal of a defective or worn-out idler roller and the installation of a new idler roller 51, 52, 53.

The subframe 1 of the replacing device for idler rollers 51, 52, 53 in the lower run of a belt conveyor for lifting the troughed web belt 7 has a c-shaped design according to FIG. 1b and FIG. 1c. The upper horizontal carrier piece is shorter than the lower horizontal carrier piece and is equipped at the top in the center of gravity with an anchoring eyelet 11 for pick-up by means of a load-pick-up means. On both sides of the lower horizontal carrier piece, this is provided with a collapsible bracket 12, 13 each, by means of which the subframe 1 is set down on the support frame 8 of the belt conveyor in the pivoted state under the web belt 7, as shown in FIG. 1b, after the unfolding of the brackets 12, 13. According to the exemplary embodiment, each idler roller station 5 in the lower run is equipped with three idler rollers 51, 52, 53. The two outer idler rollers 51, 53 are adjusted at an angle of 45° to the lower, middle idler roller 52 for troughing the web belt 7. This angle may, notwithstanding, also be 35°, 40° or another number of degrees depending on the design of the belt conveyor.

The lower horizontal carrier of the subframe 1 has two supports 14, 15, which are adjustable in their slope and which, in their starting position, lie on the surface of the carrier, and under the troughed sections of the web belt 7, can be adapted by means of a folding about a bolt connection 16, 17 to the web belt sections having oblique cross sections. The oblique position of the belt supports 14, 15 is adapted to the actual troughing of the belt. The adjustable supports 14, 15 can be locked in their oblique positions by means of struts 18, 19 arranged in an articulated manner and thus can form a construction which has a stable cross section. Consequently, the subframe 1 for lifting the web belt 7 in the upper run can be used in the troughed form in order to release the idler rollers $51^{old}$, $52^{old}$ and $53^{old}$ of the idler roller station 5 located there and to make it possible to remove the rollers.

For lifting the web belt 7 in the upper run of a belt conveyor, the subframe 1 is picked up by a service vehicle equipped with a crane at the site in question next to the idler roller station 5 with the defective or worn-out idler roller $51^{old}$, $52^{old}$ and/or $53^{old}$ and is inserted on site from the side in the clearance between the upper edge of the support frame 8 of the belt conveyor and the web belt 7 in the upper run and, as already described above, is then set down on both sides on the upper edge of the support frame 8. This position is shown in the drawing according to FIG. 1b. Then, the two supports 14, 15 are folded up in a mirror-image manner. Subsequently, the two brackets 12, 13 are pivoted downwards after the lifting of the web belt 7 due to lifting by the subframe 1 and overlying web belt 7 with the lifting apparatus of the service vehicle, such that they now lie on the upper edge of the support frame 8. The three idler rollers $51^{old}$, $52^{old}$ and $53^{old}$ of an idler roller station 5 are now exposed. FIG. 1c shows this position in the end position of the subframe 1.

Figure 2A:
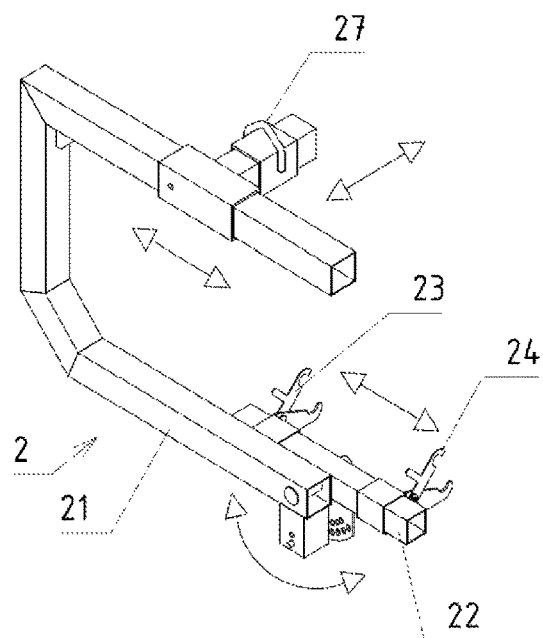
FIG. 2a is a perspective view showing the changing frame for a replacing device for idler rollers arranged in a troughed manner in the upper run in a perspective view.
Figure 2B:
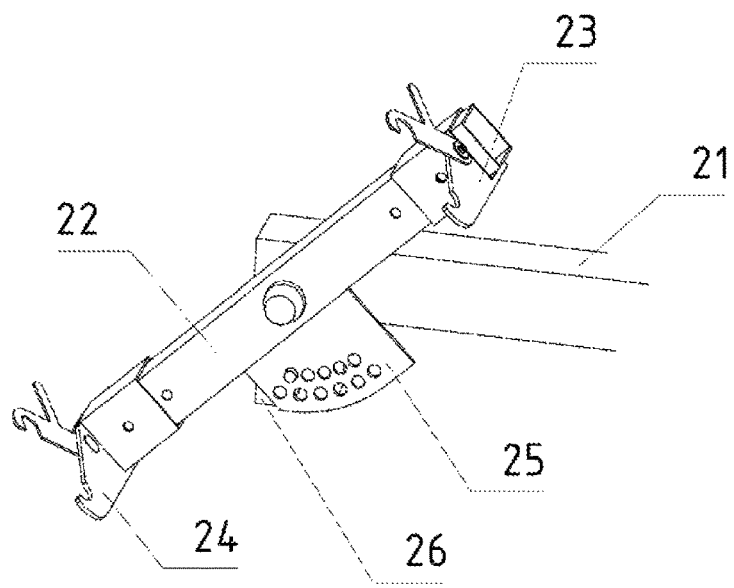
FIG. 2b is a perspective view showing the idler roller pick-up of the changing frame according to FIG. 2a with opened claws and the two perforated plates as a detail.
Figure 2C:
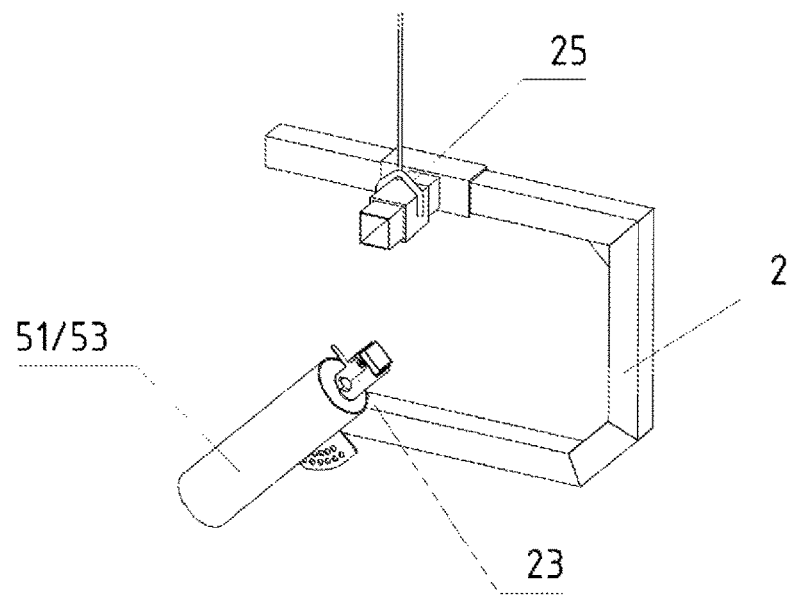
FIG. 2c is a perspective view showing a picked-up idler roller.

FIG. 2a shows the changing frame 2 for removing either a defective or worn-out idler roller $51^{old}$, $52^{old}$ and/or $53^{old}$ and for inserting one or more new functional idler rollers $51^{new}$, $52^{new}$ or $53^{new}$. The drawn arrows show the movement possibilities of the respective individual parts or modules towards one another. In the adjusted end position, these parts or modules can then be fixed to one another. The changing frame 2 consists of a c-shaped carrier 2, at whose lower horizontal carrier piece an idler roller pick-up 22, pivotable in parallel to the direction of conveying, with claws 23, 24 grasping at the axes of the worn-out and new idler rollers 51, 52 and 53, can be selectively brought manually into functional connection or detached again with the respective idler roller axis. Each of these two claws 23, 24 consists of a lower recess for the idler roller pick-up in the area of their axes and a pivotable locking mechanism, such that the idler rollers 51, 52 or 53 are held securely during the replacing movements. For adapting the claws 23, 24 to the respective length of an idler roller 51, 52 or 53 the claws 23, 24 can be displaced along the idler roller pick-up 22 and then fastened with screws in the end position. This may be necessary wherever the middle roller 52 of an idler roller station 5 is shorter than the two outer idler rollers 51, 53 arranged in a troughed manner. Idler roller pick-up 22 can be brought manually into the desired oblique position and then be adjusted by means of a bolt and two perforated plates 25, 26 provided with holes. Here, one perforated plate 25 is fastened to the pivotable idler roller pick-up 22 and the other perforated plate 26 is fastened to the carrier 21. This detail is shown in the drawing according to FIG. 2b. FIG. 2c shows the picking up of an idler roller 51, 52 or 53 with closed claws 23, 24. The lever shown at the upper half of the movable claw is provided for manual actuation for opening and closing.

At its upper horizontal carrier piece, the changing frame 2 is provided with a supporting eyelet 27, which can be longitudinally displaced along the carrier piece and can be fixed in the end position. Consequently, the changing frame 2, in its center of gravity or in the center of gravity formed with the respective idler roller 51, 52 or 53, can be picked up above this center of gravity by the load-pick-up means and held in the desired position.

Figure 2D:
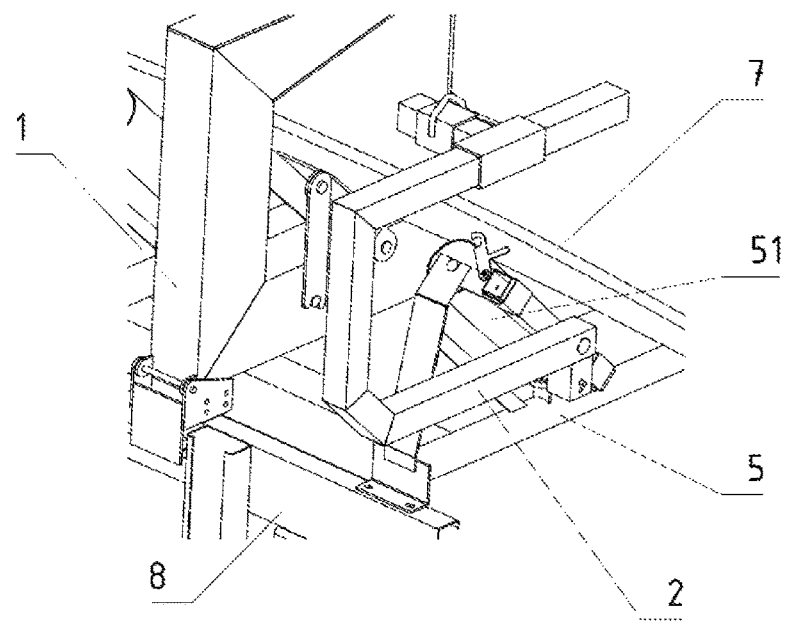
FIG. 2d is a perspective view showing the changing frame brought into position next to the subframe in the picking up of a worn-out idler roller or after the setting down of a new idler roller with opened claws.

FIG. 2d shows the arrangement of the subframe 1 and of the changing frame 2 during use at the belt conveyor during the replacement of idler rollers. The picking up of a worn-out idler roller $51^{old}$ by means of the changing frame 2, with still opened claws 23, 24, brought into position next to the subframe 1 is also shown there. The same graphical representation also results after inserting and setting down a new idler roller $51^{new}$. Since the middle idler roller 52 is more narrow than the outer idler rollers 51, 53, the distance of the claws 23, 24 grasping at the idler roller axes to one another for adapting to the idler roller pick-up 22 is designed as adjustable.

Figure 3A:
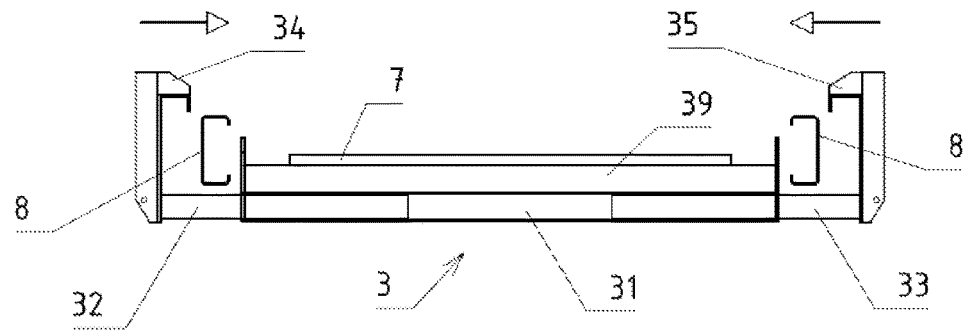
FIG. 3a is a side view showing the subframe for lifting the web belt in the lower run in the starting position.
Figure 3B:
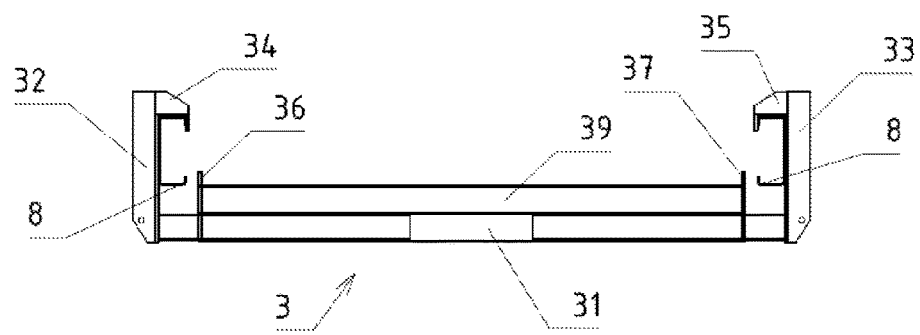

In order to be able to lift the conveyor belt 7 for replacing defective idler rollers $61^{old}$, $62^{old}$ of the idler roller stations 6 in the lower run, a subframe 3, which is u-shaped in the side view, is provided according to FIGS. 3a and 3b. It consists of a lower horizontal, middle carrier piece 31, designed as a square hollow profile, in which displacing carriers 32, 33, which are provided with hooks 34, 35, are arranged in a longitudinally displaceable/telescopic manner on both sides from outside. The carrier piece 31 is provided above with a belt support 39. The subframe 3 is pushed into the position according to FIG. 3a laterally under the conveyor belt 7 in the lower run, then lifted by means of the lifting apparatus arranged on the service vehicle via the two anchoring eyelets 36, 37 arranged at the carrier piece 31 via wire cables or a different load-pick-up means, pushed together and brought into the position shown in FIG. 3b. With its hooks 34, 35, the subframe 3 hangs on the outer longitudinal supports of the support frame 8 of the conveyor belt system. It lifts the conveyor belt 7 with its belt support 39, such that the defective or worn-out idler rollers $61^{old}$, $62^{old}$ are exposed.

The belt support 39 can be beveled upwards in a v-shaped manner at its upper support surface from the center and thus can be adapted to the position of the idler rollers 61, 62 of the idler roller station 6 in the lower run.

After the conveyor belt 7 has been lifted by using the subframe 3 together with a lifting apparatus and is held in the lifted position, the defective or worn-out idler rollers $61^{old}$ and/or $62^{old}$ can be replaced. For this, similar for the upper run, a changing frame 4, which is c-shaped, in principle, is in turn provided, with which the detached idler roller $61^{old}$ and/or $62^{old}$ of the idler roller station 6 can be picked up, lifted and pivoted laterally out of the area of the belt system, before a new idler roller $61^{new}$ and/or $62^{new}$, respectively, can be mounted in the reverse sequence.

Figure 4A:
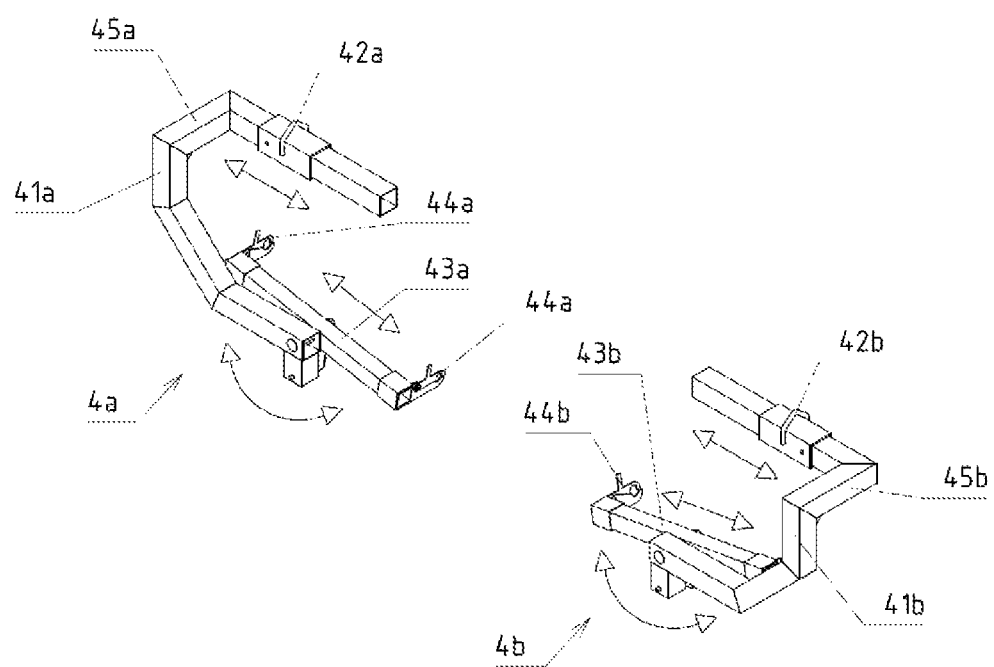
FIG. 4a is a perspective view showing the two changing frames for the idler rollers in the lower run as a detail view.

However, the different distances of the idler roller stations 5, 6 in the upper run and in the lower run are to be taken into account in the structural design of such a changing frame 4. Since the web belt 7, in the upper run, is additionally loaded by the conveyed goods and, in the lower run, during the return is empty and thus is only loaded by the belts net weight, the distances of the idler roller stations 6 to one another in the lower run may be greater than the distances of idler roller stations 5 to one another in the upper run. These different distances of the idler roller stations 5, 6 are shown in the drawing according to FIGS. 1*b* and 1*c*. In order to prevent collisions between upper run idler roller stations and lower run idler roller changing frames, two changing frames 4*a* and 4*b* are provided according to FIG. 4*a*. Both changing frames 4*a* and 4*b* consist of an, in principle, c-shaped carrier 41*a* and 41*b*. An anchoring eyelet 42*a*, 42*b* is arranged in a longitudinally displaceable and lockable manner at the top in the horizontal carrier sections. The lower horizontal carrier sections are equipped with a pivotable idler roller pick-up 43*a*, 43*b*. These idler roller pick-ups 43*a*, 43*b* are, like the idler roller pick-ups 22 for the changing frames 2, provided with claws 44*a*, 44*b* for picking up the idler rollers 61$^{old}$, 62$^{old}$ and 61$^{new}$, 62$^{new}$. The movement or displacing directions of individual parts or modules towards one another are shown by arrows in the drawing. According to FIGS. 4*a* and 4*b*, both changing frames 4*a* and 4*b* have, on the outside, horizontal sections 45*a*, 45*b*, which are designed differently from one another, by means of which the changing frames 4*a* and 4*b* are guided laterally about individual parts of the support frame 8 of the conveyor system or about idler roller stations 5 of the upper run. These sections 45*a*, 45*b* are, in practice, adapted to the respective conveyor system and are therefore do not have to be absolutely embodied with the details disclosed in the exemplary embodiment.

Figure 4B:
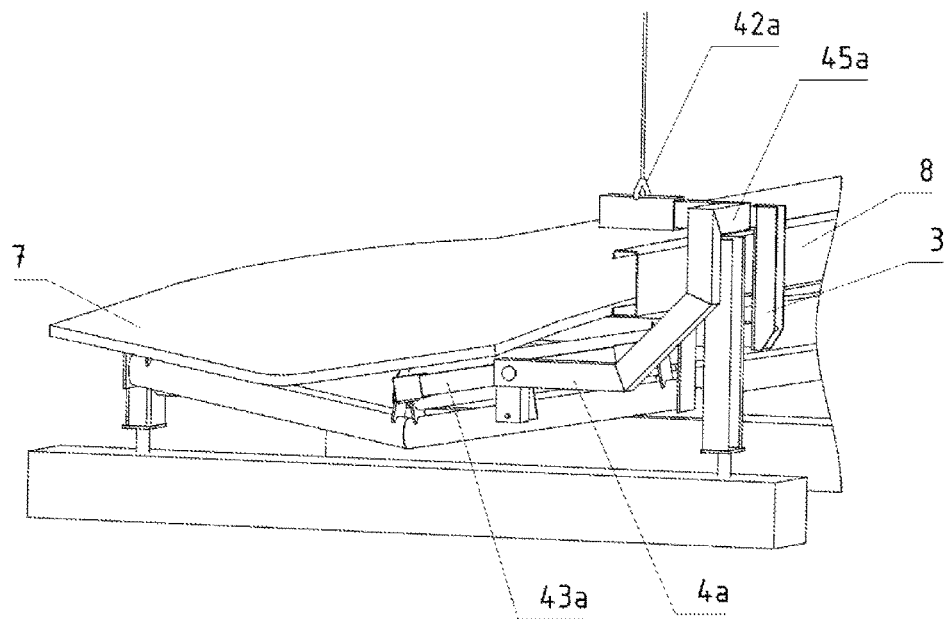
FIG. 4b is a perspective view showing the use of one of the two changing frames when picking up an idler roller to be removed in the lower run.
Figure 4C:
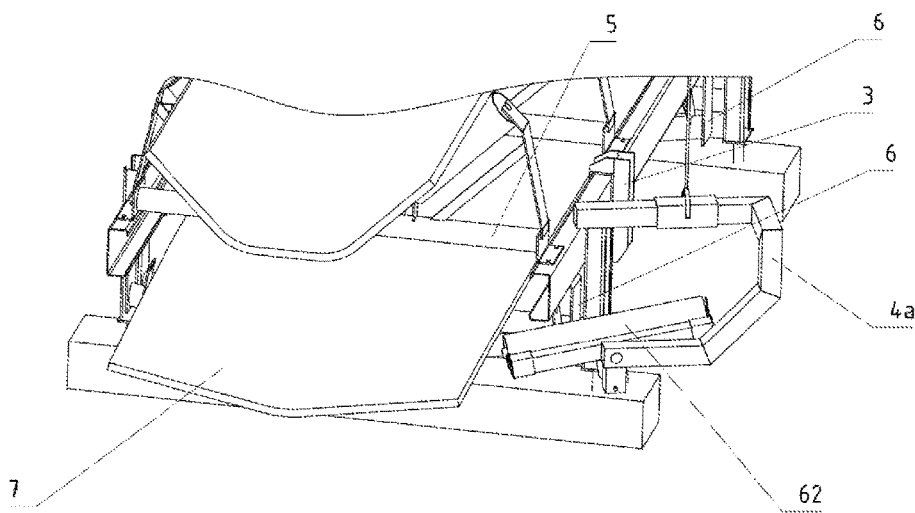
FIG. 4c is a perspective view showing the pivoting out of the picked-up old idler roller according to FIG. 4b or the pivoting in of a new idler roller.

For replacing worn-out/defective idler rollers 61$^{old}$ and/or 62$^{old}$ with new idler rollers 61$^{new}$ and/or 62$^{new}$, the suitable changing frame 4*a* or 4*b* is selected depending on the location at the belt conveyor. The drawing according to FIG. 4*b* shows the picking up of an idler roller 61$^{old}$ in the lower run to be removed and the drawing according to FIG. 4*c* shows the pivoting out of this picked-up idler roller 61$^{old}$. This idler roller 61$^{old}$ is discarded and a new idler roller 61$^{new}$ is picked up. The insertion of the new idler roller 61$^{new}$ takes place in the reverse sequence.

Only two workers are needed for replacing the idler rollers with such a device: One worker removes and installs the idler rollers by means of the device, the second worker operates the service vehicle equipped with a crane.

As an alternative, the device may be used in an adapted form also for replacing idler rollers in idler roller stations for the upper run, which are each equipped with five idler rollers arranged in a trough shape. An adaptation of the changing frame for a different number and arrangement of the idler rollers of an idler roller station for the lower run is also possible.

While specific embodiments of the invention have been shown and described in detail to illustrate the application of the principles of the invention, it will be understood that the invention may be embodied otherwise without departing from such principles.

APPENDIX

Reference Numbers

1 Subframe (upper run)
11 Anchoring eyelet
12 Pivotable bracket
13 Pivotable bracket
14 Oblique support for web belt
15 Oblique support for web belt
16 Bolt connection
17 Bolt connection
18 Strut
19 Strut
2 Changing frame (upper run)
21 c-shaped carrier
22 Idler roller pick-up
23 Claw for idler roller pick-up
24 Claw for idler roller pick-up
25 Perforated plate
26 Perforated plate
27 Anchoring eyelet
3 Subframe (lower run)
31 Carrier piece
32 Displacing carrier
33 Displacing carrier
34 Hook
35 Hook
36 Anchoring eyelet
37 Anchoring eyelet
39 Belt support
4 Changing frame (lower run)
4*a* Changing frame according to variant a
41*a* c-shaped carrier
42*a* Anchoring eyelet
43*a* Idler roller pick-up
44*a* Claws
45*b* Sections
4*b* Changing frame according to variant b
41*b* c-shaped carrier
42*b* Anchoring eyelet
43*b* Idler roller pick-up
44*b* Claws
45*b* Sections
5 Idler roller station, upper run
51 Idler roller on the right
52 Idler roller in the middle
53 Idler roller on the left
6 Idler roller station, lower run
61 Idler roller on the left
62 Idler roller on the right
7 Web belt
8 Support frame of the belt conveyor/conveyor system

What is claimed is:

1. A device for replacing individual idler rollers of a belt conveyor, the device comprising:
    a subframe for lifting a web belt in an upper run and a lower run;
    a changing frame adapted structurally to idler roller stations of the belt conveyor in the upper run and lower run; and
    a service vehicle which is conveyable and equipped with an external lifting apparatus, the subframe and the changing frame being insertable between the upper run and the lower run or between the lower run and ground surface and the subframe and the changing frame being provided at a top with anchoring eyelets and being picked up above a center of gravity respectively by the external lifting apparatus of the service vehicle using a rope engaging the anchoring eyelet.

2. A device in accordance with claim 1, wherein the subframe has a web pick up means for picking up the web belt in an entire width while maintaining a trough shape as well as support frame engagement means for setting the subframe down on or hanging the subframe on a support frame of the conveyor.

3. A device in accordance with claim 2, wherein the subframe has a plurality of supports, which are adjustable and lockable in a slope position, for picking up the web belt while maintaining the trough shape.

4. A device in accordance with claim 1, wherein the subframe has at least two collapsible brackets or hooks for setting down the subframe on or hanging the subframe on the support frame of the belt conveyor.

5. A device in accordance with claim 3, wherein the subframe has a c-shaped design, the subframe having an upper carrier piece and a lower carrier piece, whereby at least one anchoring eyelet is arranged at the upper carrier piece, the supports are arranged at the lower carrier piece at a top, and the brackets or hooks are arranged at the bottom and/or end.

6. A device in accordance with claim 1, further comprising another changing frame to provide changing frames that are each adapted structurally to idler roller stations in the upper run and lower run and have pivotable idler roller pick-ups designed as straight carriers with movable claws to form means for picking up the idler rollers.

7. A device in accordance with claim 6, wherein the idler roller pick-ups are pivotable against the changing frames in bolt connections.

8. A device in accordance with claim 1, further comprising an anchoring eyelet displaceable in parallel to and at right angles to a direction of conveying of the web belt, the anchoring eyelet being arranged at a top of the changing frame.

9. A device in accordance with claim 1, wherein for idler roller stations of the lower run, the changing frame is at least one of two changing frame variants, which can each be inserted from one side between the lower run and the ground surface, without colliding with the idler roller stations of the upper run.

10. A device in accordance with claim 5, wherein at least a portion of the upper carrier piece is arranged above at least a portion of the web belt when the subframe is inserted between the upper run and the lower run or between the lower run and the ground surface.

11. A device in accordance with claim 5, wherein the at least one anchoring eyelet is arranged at a position above at least a portion of the web belt when the subframe is inserted between the upper run and the lower run or between the lower run and the ground surface.

12. A device in accordance with claim 5, wherein the subframe comprises a vertically extending carrier piece, the upper carrier piece being connected to the lower carrier piece via the vertically extending carrier piece.

13. A device in accordance with claim 12, wherein the vertically extending carrier piece has a height that is greater than a height of the web belt.

14. A device in accordance with claim 12, wherein the vertically extending piece extends in a direction transverse to a conveying direction of the web belt.

15. A device for replacing individual idler rollers of a belt conveyor, the device comprising:
   a subframe for lifting a web belt in an upper run and a lower run, the subframe comprising an upper subframe portion;
   a changing frame adapted structurally to idler roller stations of the belt conveyor in the upper run and the lower run;
   a movable service vehicle comprising an external lifting apparatus, the subframe and the changing frame being insertable between the upper run and the lower run or between the lower run and ground surface and the subframe and the changing frame being provided at a top with anchoring eyelets, the external lifting apparatus being connected to at least one of the anchoring eyelets of the subframe and the external lifting apparatus being connected to at least one of the anchoring eyelets of the changing frame, at least a portion of the upper subframe portion being located at a position above the web belt when the subframe is inserted between the upper run and the lower run or between the lower run and the ground surface.

16. A device in accordance with claim 15, wherein at least one anchoring eyelet is arranged at the upper subframe portion, the subframe comprising a lower portion, at least a portion of the lower portion being located below the web belt when the subframe is inserted between the upper run and the lower run or between the lower run and the ground surface, wherein the external lifting apparatus is connected to the at least one of the anchoring eyelets of the subframe via a first connector and the external lifting apparatus is connected to the at least one of the anchoring eyelets of the changing frame via another connector, wherein subframe and the changing frame are lifted in a vertical direction via the external lifting apparatus.

17. A device in accordance with claim 15, wherein the subframe comprises a vertically extending carrier piece, the upper carrier piece being connected to the lower carrier piece via the vertically extending carrier piece.

18. A device in accordance with claim 17, wherein the vertically extending carrier piece has a height that is greater than a height of the web belt.

19. A device for replacing individual idler rollers of a belt conveyor, the device comprising:
   a subframe for lifting a web belt in an upper run and a lower run, the subframe comprising an upper subframe portion, a lower subframe portion and a connecting subframe portion extending between the upper subframe portion and the lower subframe portion;
   a changing frame adapted structurally to idler roller stations of the belt conveyor in the upper run and lower run;
   a movable service vehicle comprising an external lifting apparatus, the subframe and the changing frame being insertable between the upper run and the lower run or between the lower run and ground surface and the subframe and the changing frame being provided at a top with anchoring eyelets, the external lifting apparatus being connected to the subframe and the changing frame via at least the anchoring eyelets, at least a portion of the upper subframe portion being located at a position above the web belt when the subframe is inserted between the upper run and the lower run or between the lower run and the ground surface.

20. A device in accordance with claim 19, wherein at least one anchoring eyelet is arranged at the upper subframe portion, at least a portion of the lower portion being located below the web belt when the subframe is inserted between the upper run and the lower run or between the lower run and the ground surface, wherein the connecting subframe portion extends in a vertical direction, the connecting subframe portion being in direct contact with the lower subframe portion and the upper subframe portion, wherein one end portion of the connecting subframe portion extends to a position having a height that is greater than a height of the web belt, wherein the external lifting apparatus is connected to at least one of the anchoring eyelets of the subframe via a first connector and the external lifting apparatus is connected to at least one of the anchoring eyelets of the changing frame via another connector.

* * * * *